Sept. 26, 1933.  W. D. PIERSON  1,928,301
CLUTCH MECHANISM FOR HIGH SPEED WIRE SPOOLING MACHINES
Filed Jan. 29, 1930  2 Sheets-Sheet 1
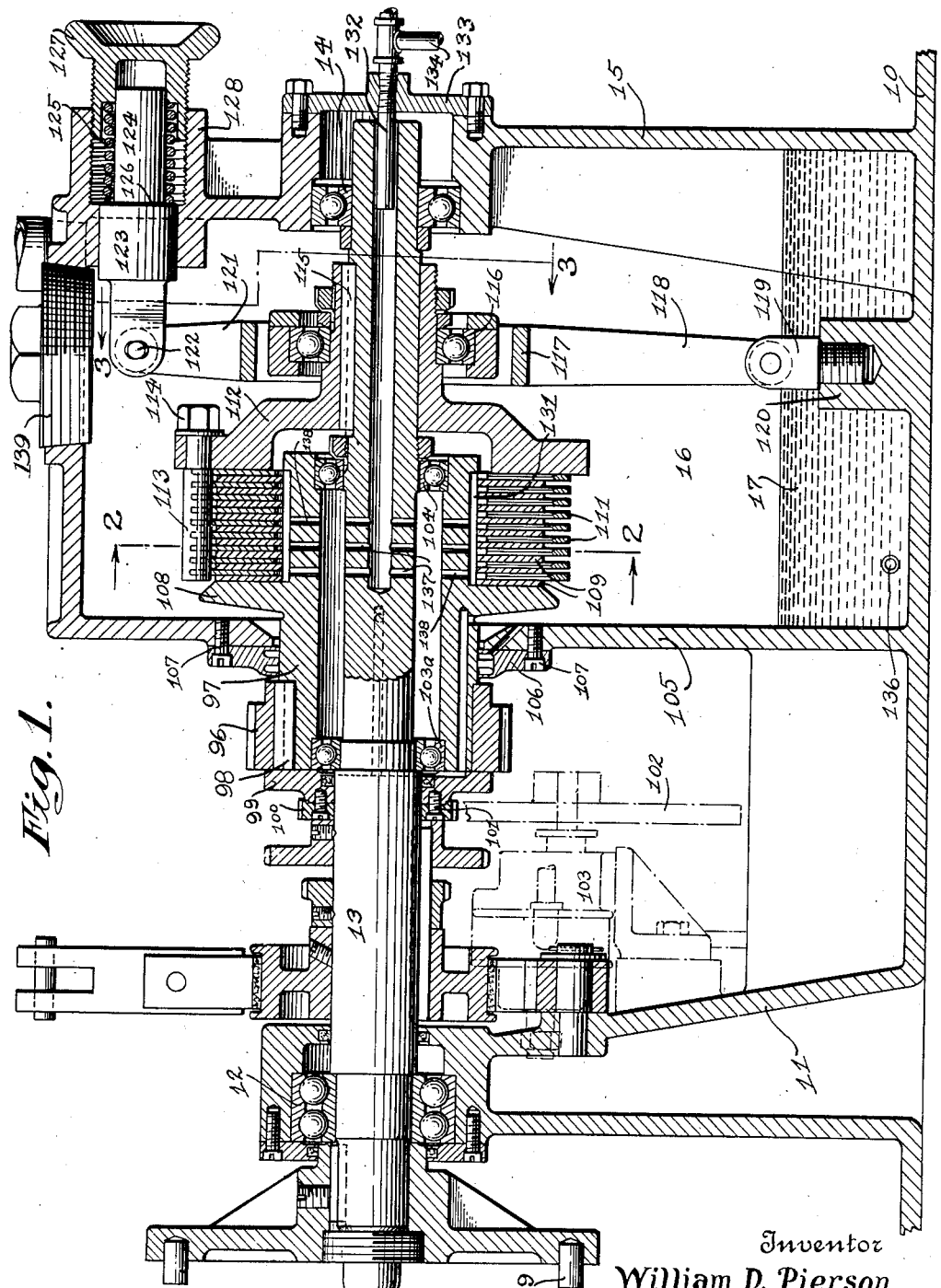
Inventor
William D. Pierson
By his Attorney
H. G. Manning Sept. 26, 1933.  W. D. PIERSON  1,928,301
CLUTCH MECHANISM FOR HIGH SPEED WIRE SPOOLING MACHINES
Filed Jan. 29, 1930  2 Sheets-Sheet 2
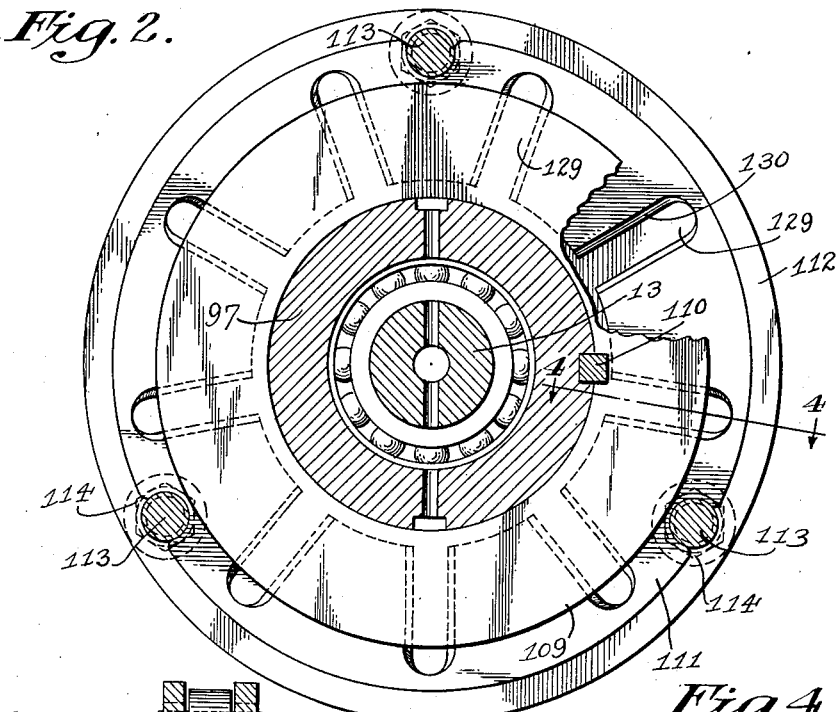
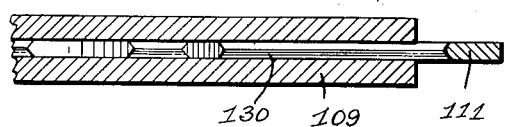
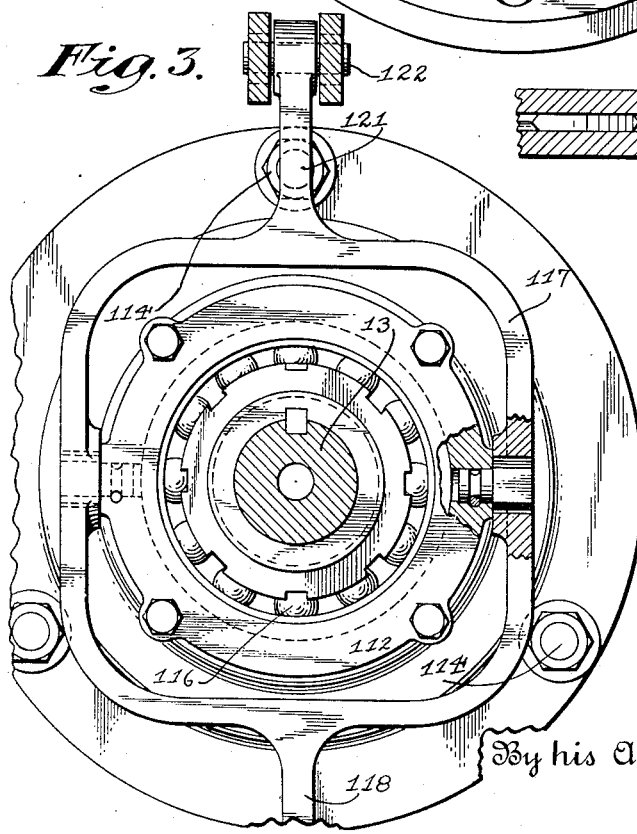
Inventor
William D. Pierson
By his Attorney
H. G. Manning Patented Sept. 26, 1933

1,928,301

UNITED STATES PATENT OFFICE 1,928,301

CLUTCH MECHANISM FOR HIGH SPEED WIRE SPOOLING MACHINES

William D. Pierson, Waterbury, Conn., assignor to The Waterbury Farrel Foundry and Machine Company, Waterbury, Conn., a corporation of Connecticut Application January 29, 1930. Serial No. 424,259

4 Claims. (Cl. 192—113)

This invention relates to wire spooling mechanism, and more particularly to a friction clutch mechanism adapted to be attached to a continuous wire-drawing machine operating at high speed.

One object of this invention is to provide a spooling machine of the above nature in which the speed of rotation of the spool will be gradually diminished as it becomes filled with wire, in order to maintain a constant peripheral wire spooling speed.

A further object is to provide an improved form of high speed clutch mechanism for transmitting power from a hollow driving hub to a spool shaft located therewithin.

A further object is to provide a high speed clutch mechanism of the above nature employing two sets of alternately arranged friction ring plates, said sets being connected to said driving hub and said spool shaft, respectively.

A further object is to provide a friction clutch mechanism of the above nature in which a copious supply of oil is pumped continuously into the interior of the spool shaft and delivered to the center of said ring plates for producing a rapid and efficient lubrication thereof, and thereby permitting the wire spooler to operate at extremely high speeds without over-heating the clutch mechanism.

A further object is to provide an improved clutch mechanism of the above nature having means for permitting manual adjustment of the pressure between the friction ring plates while the spooler is in operation.

A further object is to provide a high-speed spooling machine of the above nature which will be relatively simple in construction, inexpensive to manufacture, easy to install and manipulate, compact, and very efficient and durable in use.

With these and other objects in view, there has been illustrated on the accompanying drawings one form in which the invention may be conveniently embodied in practice.

Fig. 1 is a longitudinal vertical sectional view of the spooling machine.

Fig. 2 is a transverse sectional view of the slip-clutch mechanism, taken along the line 2—2 of Fig. 1, looking in the direction of the arrows.

Fig. 3 is a transverse sectional view of the same, taken along the broken line 3—3 of Fig. 1, looking in the direction of the arrows.

Fig. 4 is a fragmentary sectional view of three adjoining friction plates, taken along the line 4—4 of Fig. 2.

In modern wire-drawing machines it is customary to deliver the finished wire therefrom for spooling at a substantially constant speed and to gradually diminish the speed of rotation of the winding spool as it fills up by means of slip-friction clutch mechanism, in order to maintain a constant wire speed equal to that at which the wire is delivered from the wire-drawing machine.

Prior to the development of the present invention it was found necessary to operate such wire-drawing machines at a relatively low speed in order to prevent the overheating of the clutch mechanism by the friction necessarily developed therein.

By means of the present invention the above and other disadvantages have been avoided by providing a spooling machine which may be operated at an extremely high speed without over-heating the clutch mechanism. This has been accomplished by means of a continuously operated pump which is adapted to supply a large volume of oil for cooling and lubricating the slip friction plates of the clutch mechanism.

Referring now to the drawings in which like reference numerals denote corresponding parts throughout the several views, the numeral 10 indicates a bed plate adapted to rest upon the floor adjacent the end of a wire-drawing machine, not shown. Extending upwardly from the base 10 is a bracket 11 for supporting a ball-bearing 12 in which the left-hand end of a spool shaft 13 is journaled, the right-hand end of said spool shaft being journaled in a ball-bearing 14 mounted in a bracket 15 also extending upwardly from the bed plate 10 and forming part of a casing 16 adapted to contain a supply of lubricating oil 17.

Drive mechanism and friction clutch

The spooling machine is preferably supplied with power from the counter-shaft of a wire-drawing machine, not shown, through a silent chain running over a large sprocket gear 96, non-rotatively secured to a driving hub 97 by a key 98, said gear 96 being held against said hub by a collar member 99 surrounding the spool shaft 13 and fastened to the driving hub 97, as by screws not shown. A small gear 100 is secured to said collar member 99, as by screws 101, said gear 100 being adapted to mesh with a larger gear 102 for driving a rotary oil pump 103. The hub 97 is journaled within a pair of ball-bearing raceways 103a and 104, mounted upon the spool shaft 13 located within said hub.

In order to prevent the escape of oil through the wall 105 of the reservoir 16, provision is made of a ring plate 106 secured to said wall 105 as by a pair of screw bolts 107. The hub 97 is provided intermediate its ends with an enlarged flange 108 (see Fig. 1) adapted to contact with the end of a multiple disc clutch, said clutch being housed in the casing 16 and including a set of relatively small steel plates or rings 109, and a set of relatively large bronze plates or rings 111, the plates of one set alternating with the other set. The plates 109 are slidably and non-rotatively secured to the hub 97, as by a key 110 (Fig. 2). The plates 111 are slidably and non-rotatively connected to a pressure-regulated friction sleeve 112 by means of a plurality of pins 113, three in this instance, said pins being secured to said friction sleeve 112, as by nuts 114. The sleeve 112 is slidably and non-rotatively secured to the hollow end of the spool shaft 13, as by a key 115 and is journaled within a ball-bearing 116 carried by a substantially rectangular yoke member 117, the lower arm 118 of which is pivoted to a stud 119 screwed into an upstanding socket 120 in the base of the casing 16.

The upper part of the yoke member 117 has an upstanding arm 121 carrying a cross-bolt 122 adjacent its upper extremity, said bolt 122 having a loose connection with a forked adjusting shaft 123 slidably mounted in the upper part of the wall 15 of the casing 16, as shown in Fig. 1. The shaft 123 has a reduced outer section 124 surrounded by a coiled spring 125, one end of which engages a shoulder 126 on said shaft 123, the other end of said spring engaging an adjusting hand screw 127, screwed within the outer portion of a socket 128.

By means of this construction, the pressure between the sets of friction rings 109 and 111 may be readily adjusted while the machine is in operation merely by rotating the hand screw 127 in the proper direction. The large bronze plates 111 are preferably provided with a plurality of slots 129 (see Fig. 2) having beveled edges 130, said slots extending substantially two-thirds of the way from the interior of the plates 111 to the periphery thereof. It will be understood, of course, that the central openings of said plates 111 are made of sufficiently large diameter to clear the key 110 of the driving hub 97.

In order to furnish a copious supply of lubricant to the annular channel 131 in the hub 97 within the interior of the friction plates, an oil inlet pipe 132 is mounted in a cover plate 133 in the end bracket 15, said pipe 132 being connected by a pipe 134 to the oil pump 103. The other end of the pump is connected by a pipe, not shown, to a bottom outlet 13 of the oil reservoir 16.

To permit oil to flow from the interior of the spool shaft 13 to the clutch plates, provision is made of a plurality of alined apertures 137 and 138 in said spool shaft 13 and driving hub 97, respectively. A screw cover plug 139 is provided in the top of the casing 16 to permit the supply of lubricating oil 17 to be replenished whenever necessary.

In operation, the lubricant 17 from the casing 16 will be rapidly circulated by the pump 103 through the pipes 134 and 132 into the interior of the spool shaft 13 from which it will pass through the apertures 137 and 138 into the channel 131 and up between the friction plates 109 and 111. The lubricant in passing out through the clutch plates will not only cool them effectively, but at the same time, will penetrate through the beveled edges 130 of the slots 129, between the plates 109 and 111 and will effectively lubricate the rubbing surfaces thereof. This construction permits the spooler to be driven at a much higher rate of speed than was possible with previous spoolers, resulting in a greater production of spooled wire in a given time. It also results in a more uniform spooling of the wire.

One advantage of the present invention is that the spooling machine herein disclosed can be used with continuous wire-drawing machines of practically any type.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a wire-spooling machine, a driving shaft, a driven spool shaft, each of said shafts carrying a set of slip friction ring plates, the plates of one set being arranged alternately with the plates of the other set, means to supply cooling lubricant to the interior of said ring plates, the plates of one set being larger than those of the other set and having interior slots provided with beveled edges extending out beyond the periphery of the smaller plates to rapidly withdraw the heat of slip-friction from said clutch plates.

2. In a slip-friction clutch, a ring plate having a central aperture, a plurality of slots extending outwardly from said aperture and terminating short of the periphery of said plate, said ring plate being adapted to contact with a smaller ring plate, the circumference of which lies within the outer extremities of said slots, the edges of said slots being beveled to facilitate the lubrication of the contacting surfaces of said plates.

3. In a slip-friction clutch, a ring plate having a central aperture, said plate also having a plurality of slots provided with beveled edges extending outwardly from said aperture and terminating short of the periphery of said plate, said ring plate being adapted to contact with a smaller ring plate the circumference of which lies within the outer extremities of said slots.

4. In a slip-friction clutch, a ring plate having a central aperture, said plate also having a plurality of slots provided with beveled edges extending outwardly from said aperture and terminating short of the periphery of said plate, said ring plate being adapted to contact with a smaller unslotted ring plate, the circumference of which lies within the outer extremities of said slots whereby a film of lubricant will be caused to flow between said adjacent plates in a circumferential path.

WILLIAM D. PIERSON.